United States Patent [19]
Daly, Jr.

[11] Patent Number: 5,477,875
[45] Date of Patent: Dec. 26, 1995

[54] MEANS FOR AND METHOD OF HUNTING WATERFOWL

[76] Inventor: Tom E. Daly, Jr., 34528 Beachpark Ave., Eastlake, Ohio 44095

[21] Appl. No.: 151,424

[22] Filed: Nov. 15, 1993

[51] Int. Cl.⁶ ..................................................... E04H 15/30
[52] U.S. Cl. .................. 135/95; 135/901; 43/2; 2/69.5; 2/94
[58] Field of Search ..................... 135/900, 901, 135/905, 95; 43/2, 3; 2/69, 69.5, 900, 94

[56] References Cited

U.S. PATENT DOCUMENTS

| | | | |
|---|---|---|---|
| 3,799,608 | 3/1974 | Smutny et al. | 135/115 X |
| 3,839,756 | 10/1974 | Hibbert et al. | 2/69.5 |
| 3,965,505 | 6/1976 | Thorowgood | 5/413 |
| 3,988,791 | 11/1976 | Simon | 5/413 |
| 4,238,871 | 12/1980 | Cannon | 2/69.5 |
| 4,581,837 | 4/1986 | Powlus . | |
| 4,683,672 | 8/1987 | Davis | 135/901 X |
| 4,751,936 | 6/1988 | Zibble et al. | 135/901 |
| 4,761,908 | 8/1988 | Hayes . | |
| 4,773,437 | 9/1988 | Glutting | 135/117 |
| 4,777,755 | 10/1988 | Colburn . | |
| 4,798,019 | 1/1989 | Sury et al. . | |
| 5,075,999 | 12/1991 | Fredericks | 135/901 X |
| 5,142,833 | 9/1992 | Svehaug . | |

OTHER PUBLICATIONS

Outdoor World Hunting Catalog, 1990 pp. 224–227 pp. 132–134.
Cabela's 1990 Fall Catalog pp. 158–161.

Primary Examiner—Wynn E. Wood
Attorney, Agent, or Firm—Frank B. Robb; Robb & Robb

[57] ABSTRACT

A hunting blind and method of hunting which discloses a hunting blind construction which enables a hunter or other person who is seeking to obscure himself for whatever purpose, even for photographic reasons, and thus is desirably positioned so as to appear virtually flat on the ground and thus prevent waterfowl or the like from being suspicious so as to abort a landing, suitable camouflage decoration being applied to the article and even assembled from surrounding branches or other vegetation.

5 Claims, 2 Drawing Sheets

MEANS FOR AND METHOD OF HUNTING WATERFOWL

This invention relates to a means for and method of hunting water fowl specifically and more particularly the construction of hunting blinds which are usee in hunting water fowl.

It appears from my experience that water fowl have developed or inherently have the ability to recognize objects on the ground and thus any object which is above ground level will be apparent to water fowl and thus tend to make them somewhat or even absolutely reluctant to land in the area where they might normally feed.

Since the normal feeding areas of water fowl that they fly over are usually in terrain which is somewhat flat, because of the necessity to land at an angle and somewhat flat in flight, this necessitates some way of providing concealment for a hunter or the like who is desirous of either shooting the water fowl or of obtaining pictures as by photographic process therefore.

While the foregoing suggests the background of the invention, it should be noted that there are of course many forms of concealment in hunting blinds including portable tents and other devices which are exemplified by patents such as those enumerated herein and to which attention is drawn specifically. Certain of the devices are referred to as exemplifying and explaining the background for blind constructions and other related inventions and describe why many of the prior art disclosures are less successful than is desired.

In particular the patent of Powlus, U.S. Pat. No. 4,581,837 embodies this background in the prior art.

For example, U.S. Pat. Nos. 4,777,755, 4,761,908, 4,798,019, 5,142,833, and others, all project noticeably above the surrounding terrain, and thus really warn the flock leaders away from a potentially unsafe landing area.

Other patents disclose the location of blinds in tree lines and hedgerows, areas avoided by wary flocks in general.

Still other of the patents similarly disclose blind structures which provide concealment, may not be as successful to provide for certain types of water fowl and specifically geese and other related flocks which land outside of tree lines and hedge rows, generally in open areas since they can thereby do so without injuring themselves as they land and when they prepare to take off.

With that background further exemplified as stated above by the several patents listed, it is noted that the concept of this particular invention is one which provides a method of hunting to avoid scaring or warning the water fowl to stay away from a particular area by reason of the fact that the concept hereof is to provide a relatively low profile positioning of the hunter and in fact in a prone position so that he can not be observable by the water fowl who appear to understand when there is an obstruction in the general area or something that extends above the general flat area at which they seek to land.

The method I have devised of hunting is to provide for positioning a hunter so as to lie prone on the ground and use his calling method as well as being concealed by a certain type of blind which is described hereinafter and is in fact very successful in deceiving as it were the water fowl which land in the field where the hunter is lying in wait to bag the game.

While I have denominated this blind structure as a layout blind, it is obvious that the purpose is to provide a relatively flat construction which is at the same time susceptible of being rolled up into a small package for carrying to and fro and yet provides the necessary protection for long waits for water fowl to come into view.

Specifically the construction hereof is of a blind capable of blending almost imperceptibly with the surrounding terrain and camouflaged by the way in which the blind is constructed and covered with decorations and the blind at the same time can be easily moved to respond to changes in direction and the approach of the prey.

The method involves the manner of quickly and easily changing the appearance and silhouette of the blind to match surrounding vegetation or ground covered with snow.

All of the foregoing is desirable and in fact it is necessary to provide a hunter with a warm comfortable covering where inclement weather conditions exist even though he wishes to hunt during such conditions.

The further and final desire of this concept is to provide a relatively inexpensive camouflaged piece of equipment which the average hunter can afford and at the same time be portable and small enough to carry for some substantial distances without difficulty.

Turning therefore to a consideration of the specific construction of the blind hereof, and the method of its use, it will be seen that the drawing discloses in FIG. 1 a top view so to speak of the blind.

DETAILED DESCRIPTION OF THE INVENTION

It should be initially understood that the blind hereof is in fact a flexible device or article made of a durable material such as 1000 denier thickness nylon canvas on the surface of which at least one side is provided certain camouflage designs of well known form and not necessarily part of the invention except insofar as they provide the necessary concealment arrangement.

Figure 1:
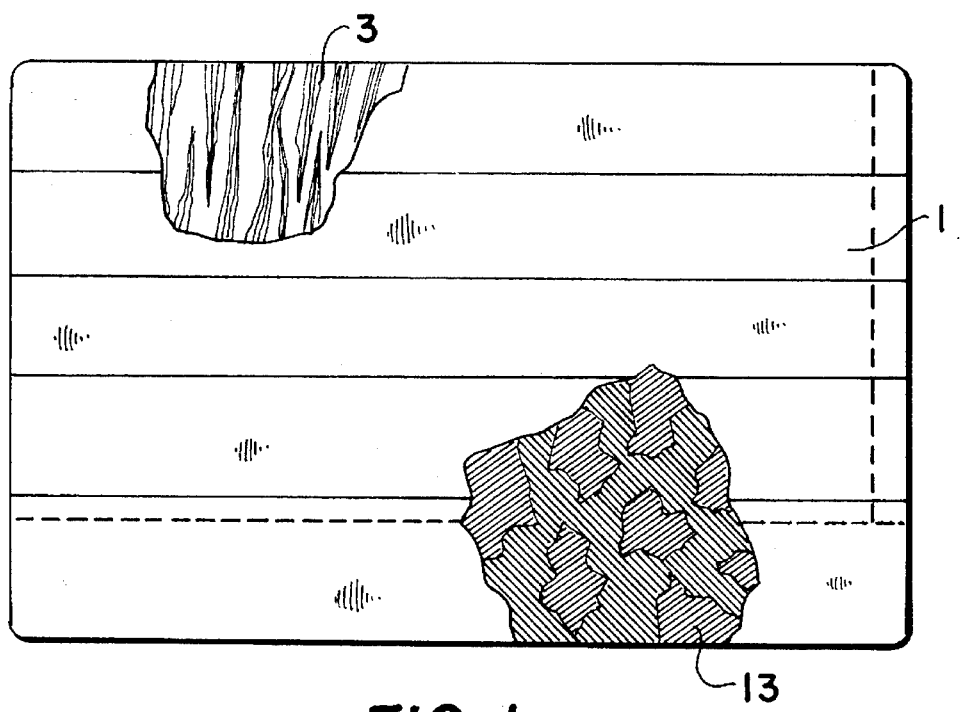
Figure 2:
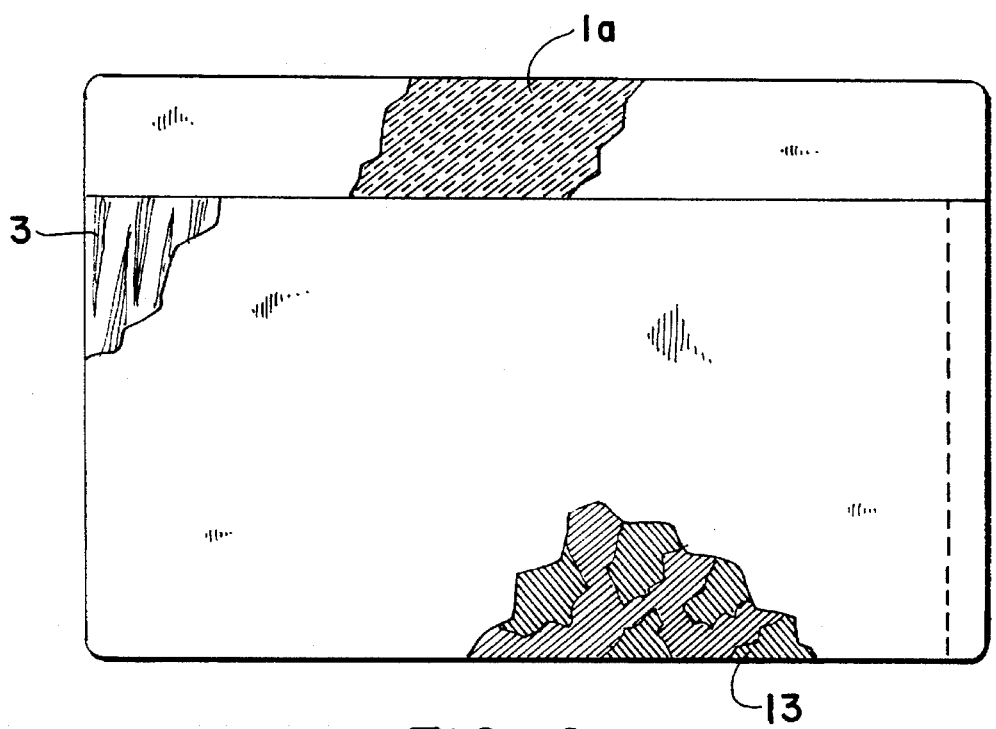
FIG. 2 is a bottom view of the blind.
Figure 3:
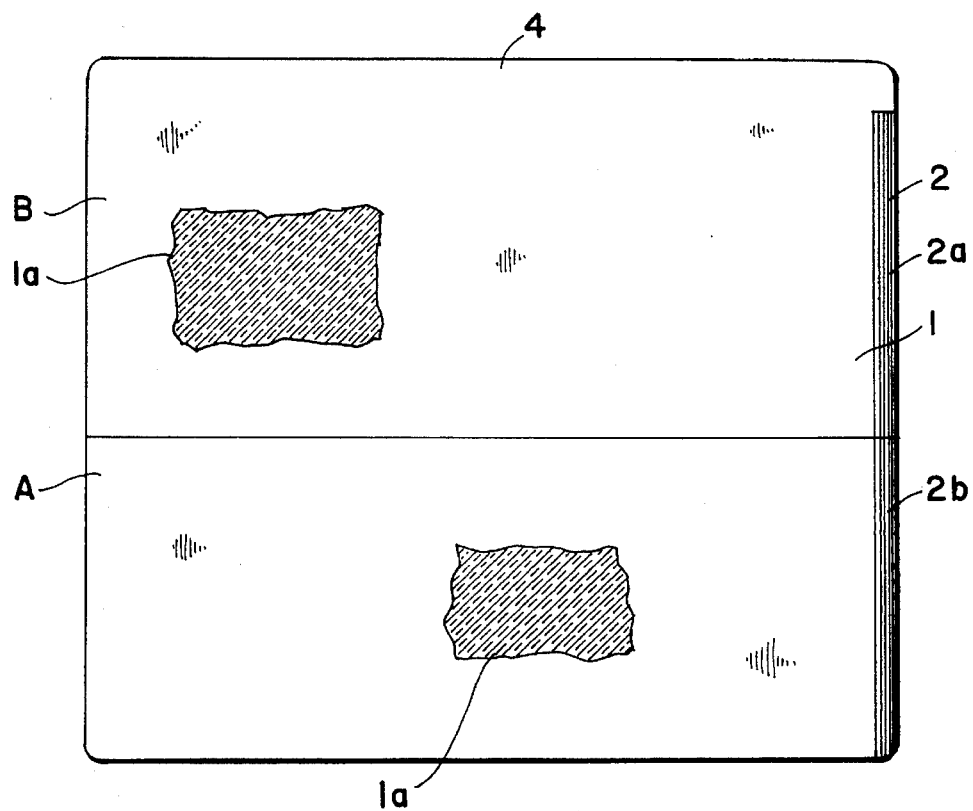
FIG. 3 is the blind in open condition exposing the interior thereof and the material covering such interior.

As will be seen, the body of the blind designated 1 is in fact rectangular in outline as shown in FIG. 3 and includes a Velcro strip 2 along one edge though not quite the entire edge but substantially so.

The article hereof is intended to have the exterior material 1a as stated, of this 1000 denier canvas because that material is very light weight, at the same time strong, and water resistant and permits the person to lie inside for long periods of time on the ground without chilling effect.

This is additionally effective by the provision of a lining of so called Sherpa wool which is indicated at 3, in the form of a sheet or covering material sewn so as to constitute the inner surface of the outer nylon covering.

Thus if a person lies down on one side of the body which is A, and folds the opposite portion of the body designated B over A with himself inside, causing the Velcro sections 2a and 2b to be engaged and thus maintain the bottom of the blind unit in closed condition.

The side B is wider than the side A and thus when B is folded over A with the individual inside, the edge portion 4 will overlap and extend beyond the edge 2c to enable the article to completely cover the individual and at the same time cover a gun or other instrument positioned alongside, the instrument being used in the hunting operation.

Figure 5:
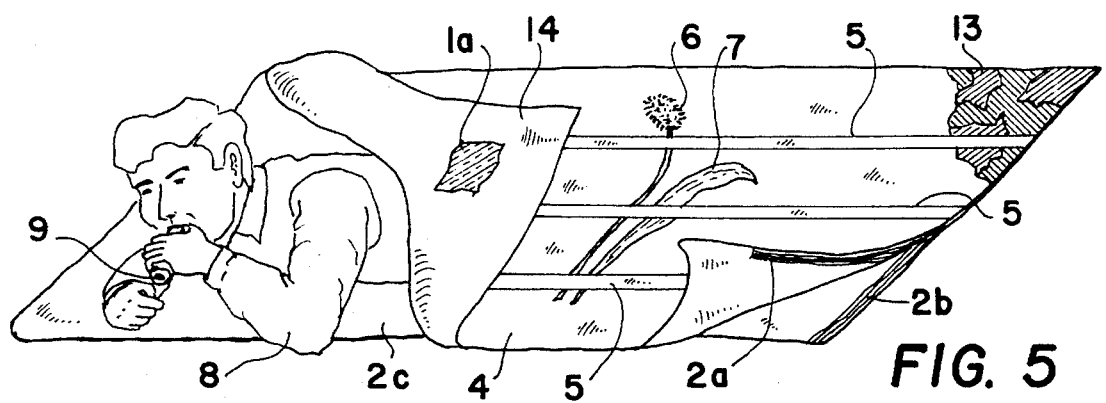
FIG. 5 is an isometric view of the blind with a hunter positioned therein.

On the outer surface of the blind article, and specifically the outer surface of the side B, a series of elastic straps of material are provided and designated 5, there being three of these shown in FIG. 5, extending lengthwise of the article and connected at the ends so as to support and maintain vegetation such as indicated at 6 and 7 underneath the straps when the side B is folded over the side As shown in FIG. 5 the manner of use of the article is shown with an individual such as indicated at 8 positioned interiorly thereof and in this instance shown with a hunting call 9 being availed of to call the water fowl to the particular area where the blind is positioned.

Figure 4:
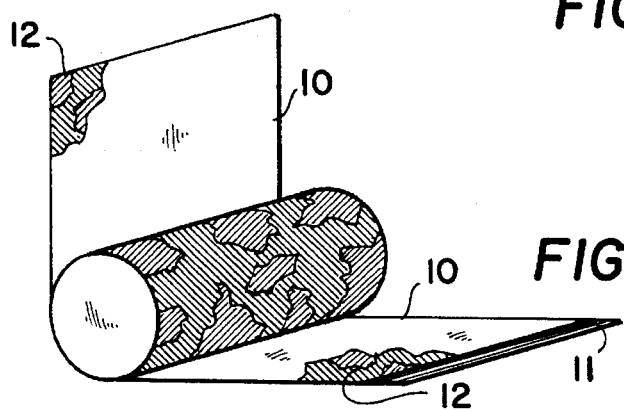
FIG. 4 shows the blind as having been rolled into its portable condition and a burlap wrap so called which is not only useful for that purpose but for other purposes as will be subsequently understood.

It will be understood that the hunter may use the cover material which is indicated at 10 in FIG. 4 specifically burlap wrap, having Velcro along the edge 11 thereof, as a face covering since it is open mesh so to speak and while it enables the hunter to see generally it will conceal his face and obscure anything which would indicate to the water fowl that there is somebody present. A camouflage coating 12 is applied to the surface. This cover material 10 is also useful to roll the blind article up in for carrying the same from place to place.

It is particularly noted that the construction hereof lends itself most desirably to use in a prone position so that the projection of the body of the individual within the blind is minimal and probably not really observable by water fowl even though they are very keen and recognize objects in general which would possibly be of danger to them.

It will be understood that the camouflage printing such as indicated at 13 is on the surface of this material and thus assists to further prevent the water fowl from recognizing anything out of the ordinary.

It is pointed out that by using the vegetation from the surrounding area and slipping the same under the elastic straps 5, further disguising and camouflaging of the device will be provided and the article or blind more useful thereby.

In actual use the hunter will take the position such as suggested in FIG. 5 and when he hears the water fowl in the distance, will provide additional concealment by turning the flap suggested at 14 over his body, and thereafter using the call 9 to attract the water fowl. When they reach the area and land the hunter can throw back the flap and side so to speak and by grasping his gun do his hunting act in a relatively rapid manner to prevent loss of the opportunity to get the water fowl.

As far as is known, the method of hunting and using a blind which is low in profile, has not heretofore been effected in any manner known to me and thus in an advantageous concept by reason of the fact that the water fowl or other prey will not be scared off since there is no observable height of the mound provided by the individual in the blind, above the surrounding surface.

It should be emphasized that while there are other ways of effecting concealment such as providing a hole in the ground in which the hunter will stand or sit, this disclosure is of such a nature as to make the article relatively quickly portable to move to different positions as conditions demand.

I claim:

1. A hunting blind comprising a rectilinear waterproof layer of high denier nylon canvas material folded to provide a pocket area between a top and a bottom side, the top and bottom sides each having an inside and outside surface, the pocket area having a top and a bottom portion, the top side being wider than the bottom side such that an edge of the top side overlaps and extends beyond an edge of the bottom side to thereby completely cover a user and a gun positioned alongside the user, each of said top and bottom sides further comprising a fastener strip located substantially along an inner edge of the bottom portion only, to maintain the bottom portion of the pocket area in a closed position while permitting the top portion to be easily separated.

2. The hunting blind of claim 1 wherein an inner lining material comprised of Sherpa wool is fastened to the nylon canvas material to provide the inside surface of the top and bottom sides of the pocket area.

3. The hunting blind of claim 1 wherein the outside surface of the top side of the pocket area includes a camouflage coating.

4. The hunting blind of claim 1 wherein the outside surface of the top side has a plurality of elastic strips extending lengthwise thereof, said elastic strips being capable of retaining camouflage vegetation.

5. A method of using the hunting blind of claim 1 comprising placing the blind which is flexible and flat with insulation therein on the ground in an area where waterfowl or other prey are likely to land, the blind having an edge, a hunter lying on the blind and folding the top side of the blind over himself, placing a gun under and near the edge of the top side of the folded blind, fastening the inner edge of the bottom portion of the folded blind, the hunter throwing back the top side when the prey approaches, raising the gun to a firing position, and firing the gun.

\* \* \* \* \*